US012688829B2

(12) United States Patent
Wang et al.

(10) Patent No.: US 12,688,829 B2
(45) Date of Patent: Jul. 21, 2026

(54) DRIVER IC, DISPLAY PANEL AND DRIVING METHOD OF THE DISPLAY PANEL

(71) Applicant: Guangzhou China Star Optoelectronics Semiconductor Display Technology Co., Ltd., Guangzhou (CN)

(72) Inventors: Xianglin Wang, Guangzhou (CN); Kyunho Kim, Guangzhou (CN)

(73) Assignee: GUANGZHOU CHINA STAR OPTOELECTRONICS SEMICONDUCTOR DISPLAY TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 19/238,356

(22) Filed: Jun. 14, 2025

(65) Prior Publication Data

US 2026/0141850 A1 May 21, 2026

(30) Foreign Application Priority Data

Nov. 20, 2024 (CN) ......................... 202411668732.8

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2310/08* (2013.01); *G09G 2320/0247* (2013.01); *G09G 2330/027* (2013.01); *G09G 2330/04* (2013.01)

(58) Field of Classification Search
CPC ................... G09G 2330/027; G09G 2330/022
See application file for complete search history.

(56) References Cited

U.S. PATENT DOCUMENTS

| | | | | |
|---|---|---|---|---|
| 10,497,302 B2* | 12/2019 | Peng | G09G 3/3677 | |
| 10,777,121 B1* | 9/2020 | Liao | G09G 3/2092 | |
| 2008/0062027 A1* | 3/2008 | Chung | G09G 3/3655 | 341/155 |
| 2008/0084371 A1* | 4/2008 | Yang | G09G 3/3688 | 345/87 |
| 2009/0058194 A1* | 3/2009 | Lee | G09G 3/3685 | 307/130 |
| 2010/0079443 A1* | 4/2010 | Chang | G09G 3/3677 | 345/98 |

(Continued)

*Primary Examiner* — Sepehr Azari

(74) *Attorney, Agent, or Firm* — PV IP PC; Christopher S. Ruprecht; Wei Te Chung

(57) ABSTRACT

Embodiments of the present disclosure provide a driver IC, a display panel and a driving method of the display panel. The driver IC includes a fast discharge circuit, and the fast discharge circuit includes an access port for accessing a fast discharge signal, a judgment sub-circuit, a buffer sub-circuit and a power-off sub-circuit. The judgment sub-circuit generates a judgment signal according to a target signal within a preset time in response to a falling edge of the fast discharge signal; the buffer sub-circuit generates a control signal and sends the control signal to the power-off sub-circuit in response to the judgment signal; and the power-off sub-circuit controls the driver IC to perform or not to perform a power-off operation in response to the control signal.

20 Claims, 4 Drawing Sheets

(56) References Cited

U.S. PATENT DOCUMENTS

| | | | | |
|---|---|---|---|---|
| 2011/0292005 | A1* | 12/2011 | Lau | G09G 3/3677 345/204 |
| 2012/0032935 | A1* | 2/2012 | Yen | G09G 3/20 345/204 |
| 2014/0184482 | A1* | 7/2014 | Zhang | G09G 3/36 345/87 |
| 2014/0340380 | A1* | 11/2014 | Song | G09G 3/3266 345/212 |
| 2016/0155409 | A1* | 6/2016 | Jeoung | G09G 3/3696 345/214 |
| 2017/0278451 | A1* | 9/2017 | Peng | G09G 3/2092 |
| 2019/0235326 | A1* | 8/2019 | Li | G09G 3/3677 |
| 2022/0199008 | A1* | 6/2022 | Lee | G09G 3/3233 |
| 2024/0347008 | A1* | 10/2024 | Kim | G09G 3/3233 |
| 2024/0412705 | A1* | 12/2024 | Chen | G09G 3/3648 |
| 2025/0252927 | A1* | 8/2025 | Byun | G09G 3/3233 |

* cited by examiner

DRIVER IC, DISPLAY PANEL AND DRIVING METHOD OF THE DISPLAY PANEL

CROSS-REFERENCE TO RELATED APPLICATION

The application claims priority to and the benefit of Chinese Patent Application No. 202411668732.8, filed on Nov. 20, 2024, the disclosure of which is incorporated herein by reference in its entirety.

TECHNICAL FIELD

The present disclosure relates to display technologies, and in particular, to a driver IC, a display panel and a driving method of the display panel.

BACKGROUND

A total capacitance in the panel of an In-Plane Switching panel (IPS panel for short) is relatively stable and has a good stability during driving, and therefore is widely used in the existing display panel field. However, the IPS panel discharges slowly when a driver IC is powered off, causing flickers or image noises. By arranging a fast discharge pin (XON pin) on the driver IC, a timing controller outputs a fast discharge signal (XON signal) to the driver IC, so that output signals of all driving circuits may be short-circuited with a common voltage signal at a moment when the driver IC is powered off, thereby realizing fast discharge of the panel. However, misoperations may easily occur when there are other interferences on the XON pin.

SUMMARY

Embodiments of the present disclosure provide a driver IC, a display panel and a driving method of the display panel, so as to at least solve the problem that misoperations may easily occur when there are other interferences on the XON pin.

In a first aspect, an embodiment of the present disclosure provides a driver IC, including a fast discharge circuit, and the fast discharge circuit including: an access port, configured to access a fast discharge signal, and the fast discharge signal being used to indicate that the driver IC is powered off; a sensing sub-circuit, connected to the access port and a power supply voltage, and configured to sense a falling edge of the fast discharge signal; a buffer sub-circuit, connected to the sensing sub-circuit, a judgment sub-circuit and a power-off sub-circuit, and configured to generate a control signal and send the control signal to the power-off sub-circuit in response to a judgment signal output by the judgment sub-circuit within a preset time after the sensing sub-circuit senses the falling edge of the fast discharge signal; the judgment sub-circuit, connected to the buffer sub-circuit, and configured to generate the judgment signal according to a state of a target signal within the preset time, and send the judgment signal to the buffer sub-circuit; and the power-off sub-circuit, connected to the buffer sub-circuit, and configured to control the driver IC to perform or not to perform a power-off operation in response to the control signal.

In a second aspect, an embodiment of the present disclosure provides a display panel, including a driver IC according to any one of the aforementioned embodiments.

In a third aspect, an embodiment of the present disclosure provides a driving method of a display panel, applied to a driver IC. The driver IC includes a fast discharge circuit, and the fast discharge circuit includes an access port for accessing a fast discharge signal, a judgment sub-circuit, a buffer sub-circuit and a power-off sub-circuit. The driving method includes: the judgment sub-circuit generates a judgment signal according to a target signal within a preset time in response to a falling edge of the fast discharge signal; the buffer sub-circuit generates a control signal and sends the control signal to the power-off sub-circuit in response to the judgment signal; and the power-off sub-circuit controls the driver IC to perform or not to perform a power-off operation in response to the control signal.

DETAILED DESCRIPTION

Figure 1:
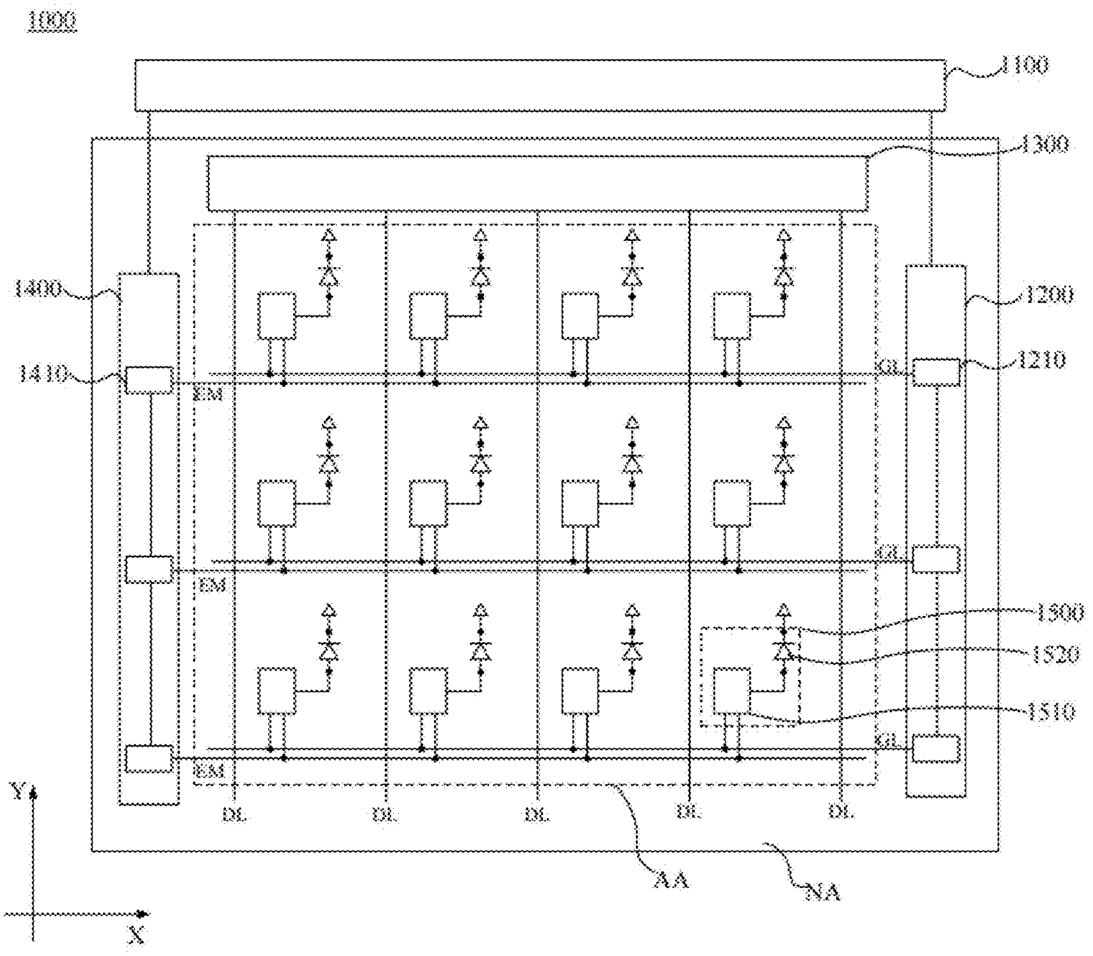
FIG. 1 is a schematic diagram of the structure of a display panel according to an optional embodiment of the present disclosure.

Technical solutions in the embodiments of the present disclosure will be described below in conjunction with drawings in the embodiments of the present disclosure. The described technical solutions are merely for explaining and illustrating the ideas of the present disclosure, and should not be construed as limiting the scope of protection of the present disclosure.

In addition, the terms "first" and "second" are used only for the purpose of description and cannot be understood as indicating or implying relative importance or implying the number of technical features indicated. Therefore, a feature limited with "first" or "second" can expressly or implicitly include one or more features. In the description of the present disclosure, "a plurality of" means two or more than two, unless otherwise explicitly and specifically limited.

In the description of the present disclosure, it should be understood that, unless specified or limited otherwise, the terms "assembled", "joined" and "connected" should be construed in a broad sense, and may be, for example, fixed connections, detachable connections, or integrated connections; may be mechanical connections, may also be electrical connections or communicate with each other; may also be direct connections or indirect connections via intervening structures; may also be inner communications of two elements or interaction relationships between two elements. For those ordinary skilled in the art, the specific meanings of the aforementioned terms in the present disclosure can be understood on a case-by-case basis.

The disclosure below provides many different embodiments or examples for implementing different structures of the present disclosure. In order to simplify the present disclosure, components and arrangements of particular examples are described below. Of course, they are examples only and are not intended to limit the present disclosure. In addition, the present disclosure may repeat reference numbers and/or reference letters in different embodiments, and such repetition is for the purpose of simplification and clarity, and does not indicate the relationship between the various embodiments and/or arrangements discussed. In addition, the present disclosure provides various embodiments of specific processes and materials, but those ordinary skilled in the art may be aware of the use of other processes and/or the use of other materials.

In the description of some embodiments, the terms "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content of the embodiments of the present disclosure.

The various embodiments provided in the present disclosure are similar, and features in different embodiments may be combined with each other.

The use of the term "configured to" in the embodiments of the present disclosure is meant as open and inclusive language that does not foreclose devices adapted to or configured to perform additional tasks or steps.

The description order of the following embodiments is not intended to limit the preferred order of the embodiments.

An embodiment of the present disclosure provides a driver IC, including a fast discharge circuit, and the fast discharge circuit including: an access port, configured to access a fast discharge signal, and the fast discharge signal being used to indicate that the driver IC is powered off; a sensing sub-circuit, connected to the access port and a power supply voltage, and configured to sense a falling edge of the fast discharge signal; a buffer sub-circuit, connected to the sensing sub-circuit, a judgment sub-circuit and a power-off sub-circuit, and configured to generate a control signal and send the control signal to the power-off sub-circuit in response to a judgment signal output by the judgment sub-circuit within a preset time after the sensing sub-circuit senses the falling edge of the fast discharge signal; the judgment sub-circuit, connected to the buffer sub-circuit, and configured to generate the judgment signal according to a state of a target signal within the preset time, and send the judgment signal to the buffer sub-circuit; and the power-off sub-circuit, connected to the buffer sub-circuit, and configured to control the driver IC to perform or not to perform a power-off operation in response to the control signal.

In some embodiments, the judgment sub-circuit is further configured to: generate a first judgment signal and send the first judgment signal to the buffer sub-circuit in response to a rising edge of the target signal within the preset time.

In some embodiments, the judgment sub-circuit is further configured to: generate the first judgment signal and send the first judgment signal to the buffer sub-circuit in response to a rising edge of the fast discharge signal within the preset time; or generate the first judgment signal and send the first judgment signal to the buffer sub-circuit in response to a rising edge of a scan driver start pulse signal within the preset time, and the scan driver start pulse signal being used to indicate that an image signal frame starts to be transmitted.

In some embodiments, the buffer sub-circuit is further configured to: generate a first control signal and send the first control signal to the power-off sub-circuit in response to the first judgment signal within the preset time; and the power-off sub-circuit is further configured to: control the driver IC not to perform the power-off operation in response to the first control signal.

In some embodiments, the judgment sub-circuit is further configured to: generate a second judgment signal and send the second judgment signal to the buffer sub-circuit in response to a continuous low-level state of the target signal within the preset time.

In some embodiments, the judgment sub-circuit is further configured to: generate the second judgment signal and send the second judgment signal to the buffer sub-circuit in response to a continuous low-level state of the fast discharge signal within the preset time; or generate the second judgment signal and send the second judgment signal to the buffer sub-circuit in response to a continuous low-level state of a scan driver start pulse signal within the preset time, and the scan driver start pulse signal being used to indicate that an image signal frame starts to be transmitted.

In some embodiments, the buffer sub-circuit is further configured to: generate a second control signal and send the second control signal to the power-off sub-circuit in response to the second judgment signal within the preset time; and the power-off sub-circuit is further configured to: control the driver IC to perform the power-off operation in response to the second control signal.

In some embodiments, the driver IC is applicable to a China Standard Point to Point Interface transmission protocol.

In some embodiments, the fast discharge circuit further includes: an electrostatic protection sub-circuit, connected to the access port and the sensing sub-circuit, and configured to perform an electrostatic discharge on the driver IC.

In some embodiments, the electrostatic protection sub-circuit includes: a diode, including a positive electrode connected to a preset low potential and a negative electrode connected to the access port and the sensing sub-circuit; and a transistor, including a control electrode connected to the preset low potential, a first electrode connected to the preset low potential, and a second electrode connected to the access port and the sensing sub-circuit.

In some embodiments, the power-off sub-circuit includes: a latch unit, configured to generate a latch signal and send the latch signal to a power-off unit in response to the control signal; and the power-off unit, configured to perform or not to perform the power-off operation in response to the latch signal.

In a second aspect, an embodiment of the present disclosure provides a display panel. The display panel includes a driver IC, and the driver IC includes a fast discharge circuit. The fast discharge circuit includes: an access port, configured to access a fast discharge signal, and the fast discharge signal being used to indicate that the driver IC is powered off; a sensing sub-circuit, connected to the access port and a power supply voltage, and configured to sense a falling edge of the fast discharge signal; a buffer sub-circuit, connected to the sensing sub-circuit, a judgment sub-circuit and a power-off sub-circuit, and configured to generate a control signal and send the control signal to the power-off sub-circuit in response to a judgment signal output by the judgment sub-circuit within a preset time after the sensing sub-circuit senses the falling edge of the fast discharge signal; the judgment sub-circuit, connected to the buffer sub-circuit, and configured to generate the judgment signal according to a state of a target signal within the preset time, and send the judgment signal to the buffer sub-circuit; and the power-off sub-circuit, connected to the buffer sub-circuit, and configured to control the driver IC to perform or not to perform a power-off operation in response to the control signal.

In a third aspect, an embodiment of the present disclosure provides a driving method of a display panel, applied to a driver IC. The driver IC includes a fast discharge circuit, and the fast discharge circuit includes an access port for accessing a fast discharge signal, a judgment sub-circuit, a buffer sub-circuit and a power-off sub-circuit. The driving method includes: the judgment sub-circuit generating a judgment signal according to a target signal within a preset time in response to a falling edge of the fast discharge signal; the buffer sub-circuit generating a control signal and sending the control signal to the power-off sub-circuit in response to the judgment signal; and the power-off sub-circuit controlling the driver IC to perform or not to perform a power-off operation in response to the control signal.

In some embodiments, the judgment sub-circuit generating the judgment signal according to the target signal within the preset time in response to the falling edge of the fast discharge signal includes: the judgment sub-circuit generating a first judgment signal and sending the first judgment signal to the buffer sub-circuit in response to a rising edge of the target signal within the preset time.

In some embodiments, the judgment sub-circuit generating the first judgment signal and sending the first judgment signal to the buffer sub-circuit in response to the rising edge of the target signal within the preset time includes: the judgment sub-circuit generating the first judgment signal and sending the first judgment signal to the buffer sub-circuit in response to a rising edge of the fast discharge signal within the preset time; or the judgment sub-circuit generating the first judgment signal and sending the first judgment signal to the buffer sub-circuit in response to a rising edge of a scan driver start pulse signal within the preset time, and the scan driver start pulse signal being used to indicate that an image signal frame starts to be transmitted.

In some embodiments, the driving method further includes: the buffer sub-circuit generating a first control signal and sending the first control signal to the power-off sub-circuit in response to the first judgment signal within the preset time; and the power-off sub-circuit controlling the driver IC not to perform the power-off operation in response to the first control signal.

In some embodiments, the judgment sub-circuit generating the judgment signal according to the target signal within the preset time in response to the falling edge of the fast discharge signal includes: the judgment sub-circuit generating a second judgment signal and sending the second judgment signal to the buffer sub-circuit in response to a continuous low-level state of the target signal within the preset time.

In some embodiments, the judgment sub-circuit generating the second judgment signal and sending the second judgment signal to the buffer sub-circuit in response to the continuous low-level state of the target signal within the preset time includes: the judgment sub-circuit generating the second judgment signal and sending the second judgment signal to the buffer sub-circuit in response to a continuous low-level state of the fast discharge signal within the preset time; or the judgment sub-circuit generating the second judgment signal and sending the second judgment signal to the buffer sub-circuit in response to a continuous low-level state of a scan driver start pulse signal within the preset time, and the scan driver start pulse signal being used to indicate that an image signal frame starts to be transmitted.

In some embodiments, the driving method further includes: the buffer sub-circuit generating a second control signal and sending the second control signal to the power-off sub-circuit in response to the second judgment signal within the preset time; and the power-off sub-circuit controlling the driver IC to perform the power-off operation in response to the second control signal.

In some embodiments, the driving method is applicable to a China Standard Point to Point Interface transmission protocol.

Beneficial effects of the embodiments of the present disclosure at least include:

the embodiments of the present disclosure provide a driver IC, a display panel and a driving method of the display panel. The driver IC includes a fast discharge circuit, and the fast discharge circuit includes an access port for accessing a fast discharge signal, a judgment sub-circuit, a buffer sub-circuit and a power-off sub-circuit. The judgment sub-circuit generates a judgment signal according to a target signal within a preset time in response to a falling edge of the fast discharge signal; the buffer sub-circuit generates a control signal and sends the control signal to the power-off sub-circuit in response to the judgment signal; and the power-off sub-circuit controls the driver IC to perform or not to perform a power-off operation in response to the control signal. By setting the preset time as a buffer stage, adding a determination condition in the buffer stage to further determine whether the fast discharge signal is effective, and then determining whether to perform the power-off operation, at least the problem that misoperations may easily occur when there are other interferences on the XON pin can be solved, and the accuracy of performing fast power-off according to the XON signal is effectively improved.

Other beneficial effects of the embodiments of the present disclosure will be further described in the following specific embodiments.

Referring to FIG. 1, an embodiment of the present disclosure provides a display panel 1000, which may be integrated in a display device, and the display device may be, but is not limited to, a television, a smartphone, a tablet computer, a notebook computer, a desktop computer, a smart speaker, a smart watch, or the like. The display panel refers to a component for displaying an image, which may include a plurality of pixel units, and each pixel unit may emit light, display a color, or reflect light to generate the image. The type of the display panel may be set according to actual conditions, for example, the display panel may be a Liquid Crystal Display (LCD) panel, an Organic Light-Emitting Diode (OLED) panel, a Mini Light-Emitting Diode (Mini-LED) panel, or a Micro Light-Emitting Diode (Micro-LED) panel, which is not limited in the embodiments of the present disclosure. The pixel units included in the display panel may exist in a form of rows and/or columns.

The display panel 1000 includes an active display area AA and a peripheral area NA located at a periphery of the active display area AA. The peripheral area of the display panel 1000 is arranged with a circuit board 1100 for providing clock signals to circuits inside the display panel 1000. The aforementioned active display area AA includes a plurality of sub-pixels 1500, and for convenience of description, the aforementioned plurality of sub-pixels 1500 in the present disclosure are described by taking a matrix arrangement as an example. In this case, sub-pixels arranged in a line along a first direction (X direction) are referred to as a row of sub-pixels, sub-pixels arranged in a line along a second direction (Y direction) are referred to as a column of sub-pixels, a row of sub-pixels may be connected to a gate signal line GL and a light-emitting control signal line EM, a column of sub-pixels may be connected to a data line DL, and the X direction and the Y direction intersect perpendicularly.

Each sub-pixel 1500 may include a pixel driving circuit 1510 and a light-emitting device 1520. The light-emitting device 1520 may emit light of at least three primary colors, such as red (R) light, green (G) light, and blue (B) light.

The display panel 1000 further includes a gate driving circuit 1200, a data driving circuit 1300, and a light-emitting control circuit 1400 arranged in the NA area, the gate driving circuit 1200 includes a plurality of cascaded gate driving sub-circuits 1210, and the light-emitting control circuit 1400 includes a plurality of cascaded light-emitting control sub-circuits 1410. Each column of sub-pixels is connected to the data driving circuit 1300 through at least one DL, each row of sub-pixels is connected to at least one gate driving sub-circuit 1210 through at least one GL, and each row of sub-pixels is connected to at least one light-emitting control sub-circuit 1410 through at least one EM. It should be noted that, according to different circuit application scenarios, a row of sub-pixels may be connected to two, three, or more gate driving sub-circuits through two, three, or more GLs, and a row of sub-pixels may be connected to two, three, or more light-emitting control sub-circuits through two, three, or more EMs. Only one signal line is taken as an example in FIG. 1 for exemplary description, which is not intended to limit the scope of the present disclosure.

In some embodiments, the light-emitting device 1520 may be an Organic Light-Emitting Diode (OLED), and a light-emitting efficiency of the light-emitting device 1520 is positively correlated with a current magnitude (or a current density) of the current flowing through the light-emitting device 1520. That is, when the current magnitude of the current flowing through the light-emitting device 1520 is small, the light-emitting efficiency of the light-emitting device 1520 is low, and when the current magnitude of the current flowing through the light-emitting device 1520 is large, the light-emitting efficiency of the light-emitting device 1520 is high. In order to improve the light-emitting efficiency of the light-emitting device 1520 when displaying a low gray scale, a light-emitting time of the light-emitting device 1520 may be modulated by the light-emitting control signal EM, that is, Pulse Width Modulation (PWM for short), so as to change a light-emitting duty cycle of the light-emitting device 1520 in one frame, thereby shortening the light-emitting time of the light-emitting device 1520. By shortening the light-emitting time of the light-emitting device 1520 and increasing the current magnitude of the current flowing through the light-emitting device 1520 during the light-emitting process of the light-emitting device 1520, the light-emitting efficiency of the light-emitting device 1520 can be improved.

The pixel driving circuit 1510, the gate driving circuit 1200, and the data driving circuit 1300 in the embodiments of the present disclosure may be implemented by any circuit capable of implementing corresponding functions in the art, which will not be specifically described. It should be noted that the gate driving circuit 1200 and the data driving circuit 1300 may be integrated on a driver IC.

Figure 2:
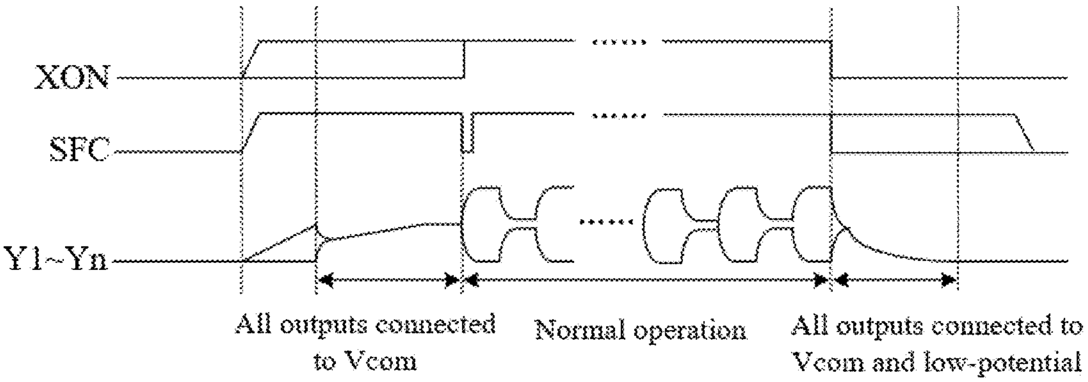
FIG. 2 is a schematic diagram of a signal timing according to an optional embodiment of the present disclosure.

Since the IPS panel discharges slowly when the IPS panel is powered off, causing visible flickers or image noises, to solve this problem, a XON access pin is arranged on the driver IC for receiving a XON signal. Referring to FIG. 2, in a stage without data signal input, all of data output signals Y1 to Yn are connected to a common voltage signal Vcom. In a normal operation state, the XON signal is at a high potential, and the Yn signal changes periodically. When the driver IC is needed to be powered off and not receive the data input, the XON signal has a falling edge, and all of the data output signals are shorted to the Vcom and connected to a preset low potential (typically VSS or GND). In general cases or in the case of experiments, when a noise or an interference occurs on the XON pin, the XON pin will recognize it as the falling edge, causing misoperations. For example, the driver IC is powered off suddenly when performing an electrostatic protection (ESD) evaluation, or the driver IC is powered off suddenly when performing other evaluation tests. The misoperations are caused by the fact that when the GND of the driver IC jitters or the signal noise occurs externally, the XON pin recognizes the phenomenon as the falling edge.

Figure 3:
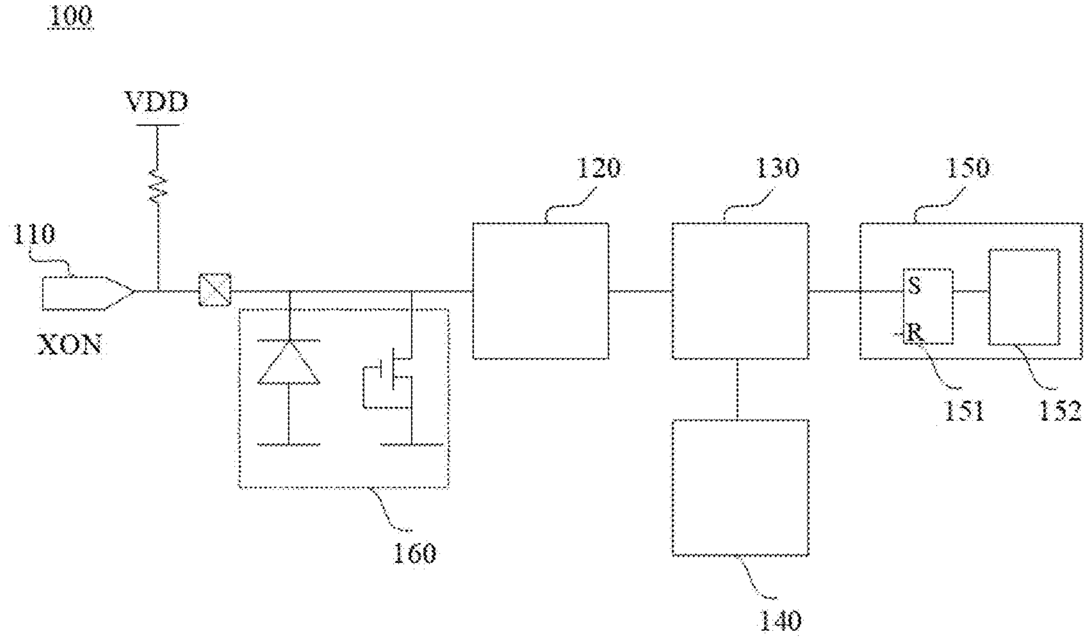
FIG. 3 is a schematic diagram of the structure of a fast discharge circuit according to an optional embodiment of the present disclosure.

To solve the aforementioned problem, an embodiment of the present disclosure provides a driver IC, including a fast discharge circuit 100. Referring to FIG. 3, the fast discharge circuit 100 includes: an access port 110, a sensing sub-circuit 120, a buffer sub-circuit 130, a judgment sub-circuit 140, and a power-off sub-circuit 150.

The access port 110 is configured to access a XON signal. The sensing sub-circuit 120 is connected to the access port 110 and a power supply voltage VDD, and the sensing sub-circuit 120 is configured to sense a falling edge of the fast discharge signal. The buffer sub-circuit 130 is connected to the sensing sub-circuit 120, the judgment sub-circuit 140 and the power-off sub-circuit 150, and the buffer sub-circuit 130 is configured to generate a control signal and send the control signal to the power-off sub-circuit 150 in response to a judgment signal output by the judgment sub-circuit 140 within a preset time T after the sensing sub-circuit 120 senses the falling edge of the fast discharge signal. The judgment sub-circuit 140 is connected to the buffer sub-circuit 130, and the judgment sub-circuit 140 is configured to generate the judgment signal according to a state of a target signal within the preset time, and send the judgment signal to the buffer sub-circuit 130. The power-off sub-circuit 150 is connected to the buffer sub-circuit 130, and the power-off sub-circuit 150 is configured to control the driver IC to perform or not to perform a power-off operation in response to the control signal.

The judgment sub-circuit generates the judgment signal according to the target signal within the preset time in response to the falling edge of the fast discharge signal; the buffer sub-circuit generates the control signal and sends the control signal to the power-off sub-circuit in response to the judgment signal; and the power-off sub-circuit controls the driver IC to perform or not to perform the power-off operation in response to the control signal. By setting the preset time as a buffer stage, adding a determination condition in the buffer stage to further determine whether the fast discharge signal is effective, and then determining whether to perform the power-off operation, at least the problem that misoperations may easily occur when there are other interferences on the XON pin can be solved, and the accuracy of performing fast power-off according to the XON signal is effectively improved.

In some embodiments, the judgment sub-circuit 140 is further configured to: generate a first judgment signal and send the first judgment signal to the buffer sub-circuit 130 in response to a rising edge of the target signal within the preset time. The preset time T herein may be a time greater than or equal to 1 frame, for example, 1 frame, 2 frames, 3 frames, 1.5 frames, or 2.5 frames, which is not limited in the embodiments of the present disclosure.

In some embodiments, the buffer sub-circuit 130 is further configured to: obtain the first judgment signal output by the judgment sub-circuit 140 within the preset time for buffering; generate a first control signal and send the first control signal to the power-off sub-circuit 150 in response to the first judgment signal; and the power-off sub-circuit 150 is further configured to: control the driver IC not to perform the power-off operation in response to the first control signal.

The target signal may be a Scan Driver Start Pulse (STB or STV for short) signal used to indicate that an image signal frame starts to be transmitted. The STB signal is generally applied to a China Standard Point-to-Point Interface (CSPI for short) protocol, and indicates a start of signal transmission of each frame. An iSTB (Internal STB function) signal is an internal signal of the CSPI driver IC, and is used to inform a start of one frame of the CSPI protocol. The target signal may also be the XON signal, which will be described in detail in the following embodiments.

In some embodiments, the judgment sub-circuit 140 is further configured to: generate the first judgment signal and send the first judgment signal to the buffer sub-circuit 130 in response to a rising edge of the fast discharge signal within the preset time; or generate the first judgment signal and send the first judgment signal to the buffer sub-circuit in response to a rising edge of the scan driver start pulse signal within the preset time. The scan driver start pulse signal is used to indicate that an image signal frame starts to be transmitted.

Figure 4:
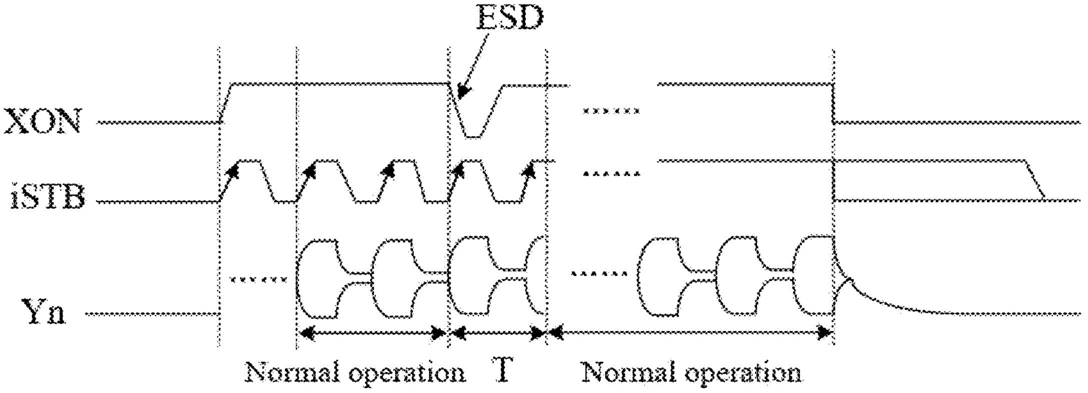
FIG. 4 is a timing diagram of an iSTB (Internal Scan Driver Start Pulse function) signal according to an optional embodiment of the present disclosure.

Referring to FIG. 4, when the target signal is the iSTB signal, within the preset time for buffering, it is determined whether a rising edge occurs in the iSTB signal, that is, it is determined whether a new signal frame is input. If the rising edge of the iSTB signal occurs, the judgment sub-circuit 140 generates the first judgment signal and sends the first judgment signal to the buffer sub-circuit 130, and the buffer sub-circuit 130 resets the XON signal, enabling the XON signal to restore the high potential, so that the power-off sub-circuit does not perform the power-off operation.

Figure 6:
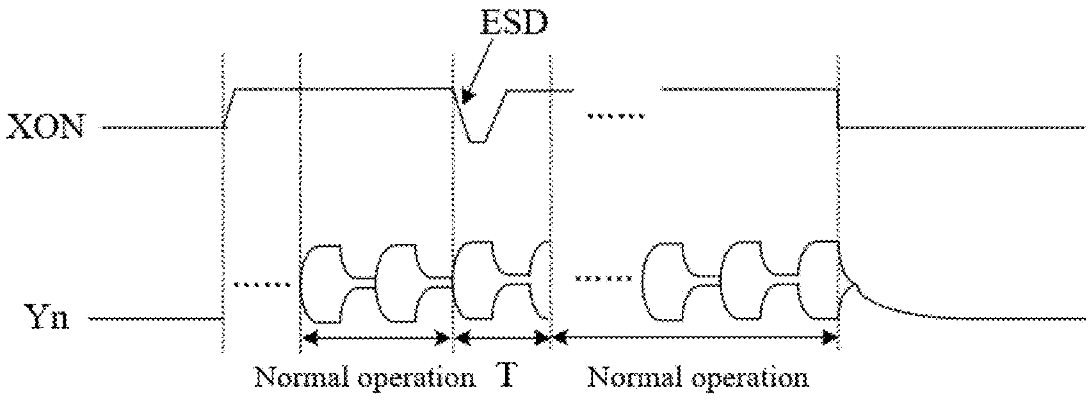
FIG. 6 is a timing diagram of a XON signal according to an optional embodiment of the present disclosure.

Referring to FIG. 6, when the target signal is the XON signal, within the preset time for buffering, it is determined whether a rising edge occurs in the XON signal, that is, it is determined whether a new signal frame is input. If the rising edge of the XON signal occurs, the judgment sub-circuit 140 generates the first judgment signal and sends the first judgment signal to the buffer sub-circuit 130, and the buffer sub-circuit 130 resets the XON signal, enabling the XON signal to restore the high potential, so that the power-off sub-circuit does not perform the power-off operation.

In some embodiments, the judgment sub-circuit 140 is further configured to: generate the second judgment signal and send the second judgment signal to the buffer sub-circuit in response to a continuous low-level state of the fast discharge signal within the preset time; or generate the second judgment signal and send the second judgment signal to the buffer sub-circuit in response to a continuous low-level state of a scan driver start pulse signal within the preset time. The scan driver start pulse signal is used to indicate that an image signal frame starts to be transmitted.

When the target signal is the iSTB signal, within the preset time for buffering, it is determined whether a rising edge occurs in the iSTB signal, that is, it is determined whether a new signal frame is input. If the rising edge of the iSTB signal does not occur and the iSTB signal is maintained at a low-level state, the judgment sub-circuit 140 generates the second judgment signal and sends the second judgment signal to the buffer sub-circuit 130, and the buffer sub-circuit 130 sends the second control signal to enable the power-off sub-circuit to perform the power-off operation.

When the target signal is the XON signal, within the preset time for buffering, it is determined whether a rising edge occurs in the XON signal, that is, it is determined whether a new signal frame is input. If the rising edge of the XON signal does not occur and the XON signal is maintained at a low-level state, the judgment sub-circuit 140 generates the second judgment signal and sends the second judgment signal to the buffer sub-circuit 130, and the buffer sub-circuit 130 sends the second control signal to enable the power-off sub-circuit to perform the power-off operation.

An example in which the target signal is the iSTB signal is used for exemplary description. Referring to FIG. 4, when a falling edge occurs in the XON signal, a preset time T for buffering is set to avoid an immediate power-off when the falling edge occurs in the XON signal, that is, it is avoided that all data output signals are immediately shorted to the Vcom when the falling edge occurs in the XON signal. The preset time T herein may be a time greater than or equal to a transmission time of one data frame, for example, may be a transmission time of 1 data frame, 2 data frames, 3 data frames, 1.5 data frames, or 2.5 data frames, which is not limited in the embodiments of the present disclosure. Within the preset time for buffering, it is determined whether a rising edge occurs in the iSTB signal, that is, it is determined whether a new signal frame is input. If the rising edge of the iSTB signal occurs, the buffer sub-circuit resets the XON signal to the high potential, all data output signals are not shorted to the Vcom, so that the power-off sub-circuit does not perform the power-off operation. For example, as shown in FIG. 4, within the preset time T, the rising edge of the iSTB signal occurs, and therefore, the power-off operation is not performed, and the driver IC continues to operate normally.

Figure 5:
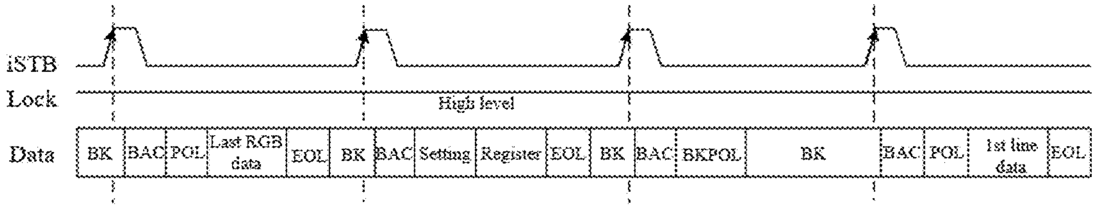
FIG. 5 is a timing diagram of another iSTB signal according to an optional embodiment of the present disclosure.

Referring to FIG. 5, in the data transmission protocol of CSPI, the rising edge of each iSTB signal indicates a start of the next frame. During a data frame transmission, a Lock signal is maintained at a high-level state to ensure that the display panel can normally receive data. BK (blanking time) indicates a spare information, that is, invalid information, of each frame in a data transmission process, BAC (Begin active command) indicates to start to execute various signal commands in one frame, POL (Polarity) is used to confirm a polarity of the data frame, and EOL (Command End) indicates an end command signal. Referring to FIG. 5, the first three frames are initialization information, the fourth frame transmits the first column of data information, that is, 1st line data, and so on, and the next frame is 2nd line data.

In some embodiments, the target signal may be the fast discharge signal, that is, the XON signal. If the XON pin is triggered by mistakes, the XON signal may recover to a high-level by itself within the preset time T.

An example in which the target signal is the XON signal is used for exemplary description. Referring to FIG. 6, a buffering function may be added when a falling edge of the XON pin is input, and the buffering function may be a preset time for buffering. The preset time T herein may be a time greater than or equal to 1 frame, for example, 1 frame, 2 frames, 3 frames, 1.5 frames, or 2.5 frames, which is not limited in the embodiments of the present disclosure. Immediately power-off, when the falling edge of the XON is input, is avoided, that is, it is avoided that all data output signals are immediately shorted to the Vcom. Within the preset time for buffering, it is determined whether a rising edge occurs in the XON signal, that is, it is determined whether a new signal frame is input. If a rising edge occurs, all data output signals are not shorted to the Vcom, so that the power-off sub-circuit does not perform the power-off operation. For example, as shown in FIG. 6, within the preset time T, the rising edge of the XON signal occurs, and therefore, the power-off operation is not performed, and the driver IC continues to operate normally.

Figure 7:
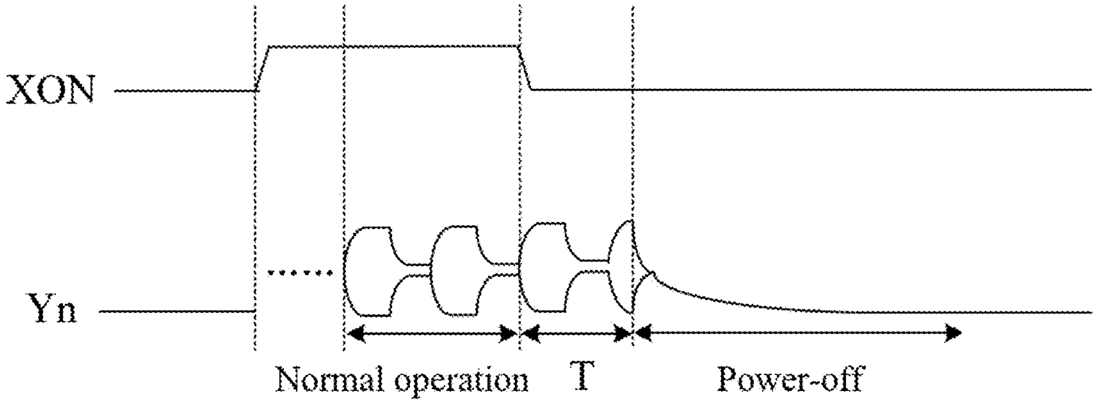
FIG. 7 is a timing diagram of another XON signal according to an optional embodiment of the present disclosure.

Referring to FIG. 7, within the preset time for buffering, it is determined whether a rising edge occurs in the XON signal, that is, it is determined whether a new signal frame is input. If a rising edge occurs in the XON signal, the data output signals are not shorted to the Vcom, so that the power-off sub-circuit does not perform the power-off operation. If there is no rising edge in the XON signal, it is determined that the XON signal is effective, and the power-off operation is performed. For example, as shown in FIG. 7, within the preset time T, there is no rising edge in the XON signal, a case that the XON pin is triggered by mistakes is excluded, and it is determined that the power-off operation is performed.

In some embodiments, the fast discharge circuit further includes an electrostatic protection sub-circuit 160, it is connected to the access port 110 and the sensing sub-circuit 120, and configured to perform an electrostatic discharge on the driver IC.

In some embodiments, the electrostatic protection sub-circuit 160 includes a diode, which includes a positive electrode connected to a preset low potential and a negative electrode connected to the access port 110 and the sensing sub-circuit 120; and a transistor, which includes a control electrode connected to the preset low potential, a first electrode connected to the preset low potential, and a second electrode connected to the access port 110 and the sensing sub-circuit 120.

It should be noted that the transistor used in all the embodiments of the present disclosure may be a Thin Film Transistor (TFT for short), or a Metal Oxide Semiconductor (MOS for short), or other devices with a same characteristic, which is not limited in the embodiments of the present disclosure.

Exemplarily, the transistor may be a TFT. The TFT may be manufactured by an a-Si process, an oxide semiconductor process, a Low Temperature Poly-silicon (LTPS for short) process, or a High Temperature Poly-silicon (HTPS for short) process. The embodiments of the present disclosure do not limit on this.

A type of the transistor is not limited in the embodiments of the present disclosure. The transistor may be an N-type transistor, a P-type transistor, an enhancement transistor, or a depletion transistor. In the embodiments of the present disclosure, an example in which all the transistors are P-type transistors is used to exemplarily describe the present disclosure. The P-type transistor turns on under an action of a low-level voltage signal, and turns off under an action of a high-level voltage signal. That is, a working voltage of the P-type transistor is a low-level voltage, and a turn-off voltage of the P-type transistor is a high-level voltage.

In the embodiments of the present disclosure, a gate electrode of the transistor is the control electrode. Meanwhile, in order to distinguish two electrodes other than the gate electrode of the transistor, it is directly described that one electrode is a first electrode and the other electrode is a second electrode. In this case, the first electrode of the transistor may be one of a source electrode and a drain electrode of the transistor, and the second electrode may be the other one of the source electrode and the drain electrode of the transistor. Since the source electrode and the drain electrode of the transistor may be symmetrical in structure, the source electrode and the drain electrode of the transistor may be indistinguishable in structure.

In some embodiments, the power-off sub-circuit 150 includes: a latch unit 151, configured to generate a latch signal and send the latch signal to a power-off unit 152 in response to the control signal; and the power-off unit 152, configured to perform or not to perform the power-off operation in response to the latch signal.

An embodiment of the present disclosure further provides a display panel, including the driver IC according to any one of the aforementioned embodiments, and what has been stated is not repeated herein.

Figure 8:
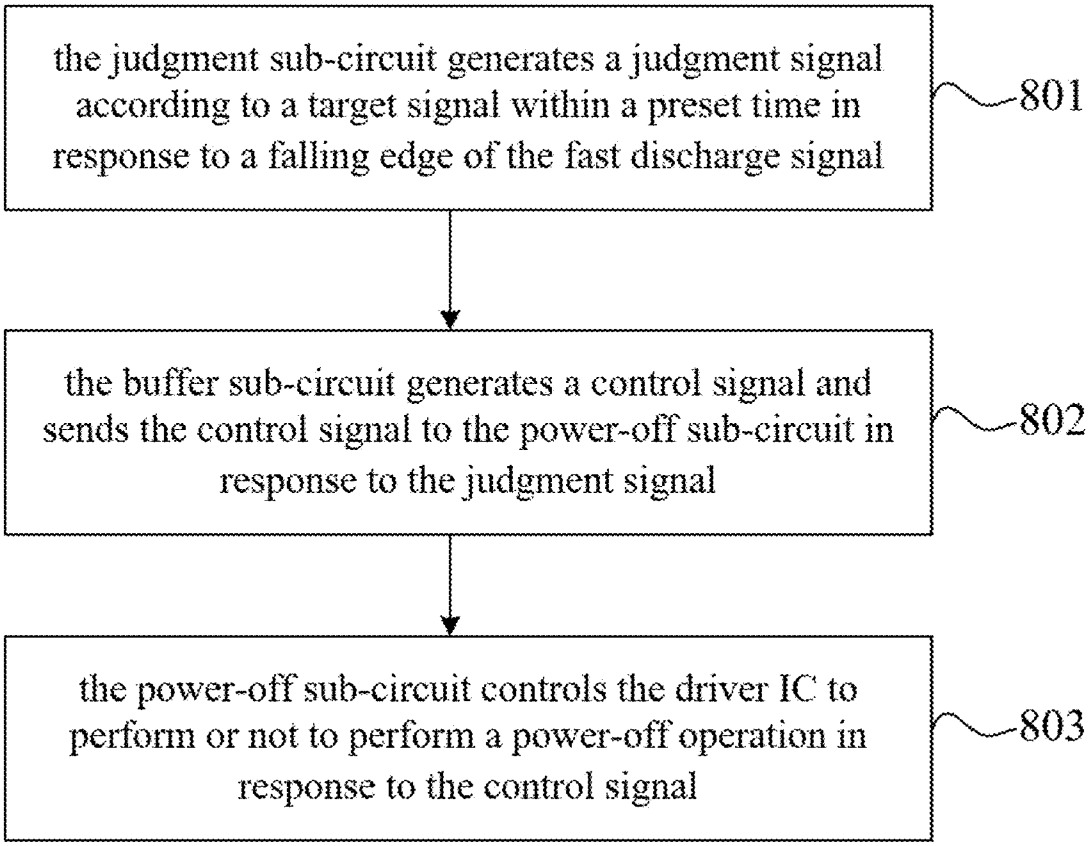
FIG. 8 is a schematic flowchart of a driving method of the display panel according to an optional embodiment of the present disclosure.

An embodiment of the present disclosure further provides a driving method of a display panel, applied to a driver IC. The driver IC includes a fast discharge circuit, and the fast discharge circuit includes an access port for accessing a fast discharge signal, a judgment sub-circuit, a buffer sub-circuit and a power-off sub-circuit. The driving method may be applied to the driver IC described in any one of the aforementioned embodiments, and what has been described is not repeated herein. Referring to FIG. 8, the driving method includes:

Step S801, the judgment sub-circuit generates a judgment signal according to a target signal within a preset time in response to a falling edge of the fast discharge signal.

Step S802, the buffer sub-circuit generates a control signal and sends the control signal to the power-off sub-circuit in response to the judgment signal.

Step S803, the power-off sub-circuit controls the driver IC to perform or not to perform a power-off operation in response to the control signal.

In some embodiments, the judgment sub-circuit generating the judgment signal according to the target signal within the preset time in response to the falling edge of the fast discharge signal includes: the judgment sub-circuit generating a first judgment signal and sending the first judgment signal to the buffer sub-circuit in response to a rising edge of the target signal within the preset time.

In some embodiments, the judgment sub-circuit generating the first judgment signal and sending the first judgment signal to the buffer sub-circuit in response to the rising edge of the target signal within the preset time includes: the judgment sub-circuit generating the first judgment signal and sending the first judgment signal to the buffer sub-circuit in response to a rising edge of the fast discharge signal within the preset time; or the judgment sub-circuit generating the first judgment signal and sending the first judgment signal to the buffer sub-circuit in response to a rising edge of a scan driver start pulse signal within the preset time, and the scan driver start pulse signal being used to indicate that an image signal frame starts to be transmitted.

In some embodiments, the driving method further includes: the buffer sub-circuit generating a first control signal and sending the first control signal to the power-off sub-circuit in response to the first judgment signal within the preset time; and the power-off sub-circuit controlling the driver IC not to perform the power-off operation in response to the first control signal.

In some embodiments, the judgment sub-circuit generating the judgment signal according to the target signal within the preset time in response to the falling edge of the fast discharge signal includes: the judgment sub-circuit generating a second judgment signal and sending the second judgment signal to the buffer sub-circuit in response to a continuous low-level state of the target signal within the preset time.

In some embodiments, the judgment sub-circuit generating the second judgment signal and sending the second judgment signal to the buffer sub-circuit in response to the continuous low-level state of the target signal within the preset time includes: the judgment sub-circuit generating the second judgment signal and sending the second judgment signal to the buffer sub-circuit in response to a continuous low-level state of the fast discharge signal within the preset time; or the judgment sub-circuit generating the second judgment signal and sending the second judgment signal to the buffer sub-circuit in response to a continuous low-level state of a scan driver start pulse signal within the preset time, and the scan driver start pulse signal being used to indicate that an image signal frame starts to be transmitted.

In some embodiments, the driving method further includes: the buffer sub-circuit generating a second control signal and sending the second control signal to the power-off sub-circuit in response to the second judgment signal within the preset time; and the power-off sub-circuit controlling the driver IC to perform the power-off operation in response to the second control signal.

In some embodiments, the driving method is applicable to a CSPI transmission protocol.

In the embodiments of the present disclosure, by setting the preset time as a buffer stage, adding a determination condition in the buffer stage to further determine whether the fast discharge signal is effective, and then determining whether to perform the power-off operation, at least the problem that misoperations may easily occur when there are other interferences on the XON pin can be solved, and the accuracy of performing fast power-off according to the XON signal is effectively improved.

An embodiment of the present disclosure further provides a non-transitory computer-readable storage medium, storing a computer program, and the computer program, when executed by a processor, implementing the steps of the driving method of the display panel described above. The non-transitory computer-readable storage medium has all the beneficial effects of the driving method of the display panel described above, which will not be repeated herein.

An embodiment of the present disclosure further provides an electronic device, including: a memory and a processor. The memory stores a computer program; and the processor is configured to execute the computer program in the memory to implement the steps of the driving method of the display panel described above. The electronic device has all the beneficial effects of the driving method of the display panel described above, which will not be repeated herein.

The computer-readable storage medium may be, for example, an electrical, magnetic, optical, electromagnetic, infrared, or semiconductor system, apparatus, or device, or any combination thereof, which is not specifically limited in the present disclosure. More specific examples of the computer-readable storage medium may include, but are not limited to: an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In some embodiments of the present disclosure, the computer-readable storage medium may be any tangible medium that includes or stores a program, and the program may be used by or in combination with an instruction execution system, apparatus, or device.

The computer-readable storage medium may be included in the electronic device, or may be standalone without being assembled into the electronic device.

Computer program codes for performing operations of some embodiments of the present disclosure may be written in any combination of one or more programming languages, and the programming languages include object oriented programming languages such as Java, Smalltalk, and C++, or conventional procedural programming languages such as the "C" programming language or similar programming languages. The program codes may be executed entirely on a computer of a user, partly on the computer of the user, as a stand-alone software package, partly on the computer of the user and partly on a remote computer, or entirely on the remote computer or a server. In situations involving the remote computer, the remote computer may be connected to the computer of the user through any type of networks (including a local area network (LAN) or a wide area network (WAN)), or may be connected to an external computer (for example, through an internet using an internet service provider).

The flowcharts and block diagrams in the figures illustrate the architectures, functions, and operations of possible implementations of systems, methods and computer program products according to various embodiments of the present disclosure. In this regard, each block in the flowcharts or block diagrams may represent a module, a segment, or a portion of codes, that includes one or more executable instructions for implementing a specified logical function.

It should also be noted that, in some alternative implementations, the functions noted in the blocks may also occur in a different order than the orders noted in the figures.

Specific examples are used in the embodiments of the present disclosure to describe the principles and implementations of the present disclosure, and the description of the above embodiments is only used to help understand the method of the present disclosure and the core idea thereof; meanwhile, for those skilled in the art, according to the idea of the present disclosure, there will be changes in the specific implementations and application scopes, and in summary, the content of the present disclosure should not be construed as limiting the present disclosure.

The above descriptions are merely specific embodiments of the present disclosure, but the protection scope of the present disclosure is not limited thereto, and any variation or replacement that is conceived by a person skilled in the art within the technical scope disclosed in the present disclosure shall fall within the protection scope of the present disclosure. Therefore, the protection scope of the present disclosure is defined by the scope of the claims.

What is claimed is:

1. A driver IC, comprising a fast discharge circuit, wherein the fast discharge circuit comprises:

an access port, configured to access a fast discharge signal; wherein the fast discharge signal is used to indicate that the driver IC is powered off;

a sensing sub-circuit, connected to the access port and a power supply voltage, and configured to sense a falling edge of the fast discharge signal;

a buffer sub-circuit, connected to the sensing sub-circuit, a judgment sub-circuit and a power-off sub-circuit, and configured to generate a control signal and send the control signal to the power-off sub-circuit in response to a judgment signal output by the judgment sub-circuit within a preset time after the sensing sub-circuit senses the falling edge of the fast discharge signal;

the judgment sub-circuit, connected to the buffer sub-circuit, and configured to generate the judgment signal according to a state of a target signal within the preset time, and send the judgment signal to the buffer sub-circuit; and the power-off sub-circuit, connected to the buffer sub-circuit, and configured to control the driver IC to perform or not to perform a power-off operation in response to the control signal.

2. The driver IC according to claim 1, wherein the judgment sub-circuit is further configured to:

generate a first judgment signal and send the first judgment signal to the buffer sub-circuit in response to a rising edge of the target signal within the preset time.

3. The driver IC according to claim 2, wherein the judgment sub-circuit is further configured to:

generate the first judgment signal and send the first judgment signal to the buffer sub-circuit in response to a rising edge of the fast discharge signal within the preset time; or generate the first judgment signal and send the first judgment signal to the buffer sub-circuit in response to a rising edge of a scan driver start pulse signal within the preset time; wherein the scan driver start pulse signal is used to indicate that an image signal frame starts to be transmitted.

4. The driver IC according to claim 2, wherein the buffer sub-circuit is further configured to:

generate a first control signal and send the first control signal to the power-off sub-circuit in response to the first judgment signal within the preset time; and the power-off sub-circuit is further configured to:

control the driver IC not to perform the power-off operation in response to the first control signal.

5. The driver IC according to claim 1, wherein the judgment sub-circuit is further configured to:

generate a second judgment signal and send the second judgment signal to the buffer sub-circuit in response to a continuous low-level state of the target signal within the preset time.

6. The driver IC according to claim 5, wherein the judgment sub-circuit is further configured to:

generate the second judgment signal and send the second judgment signal to the buffer sub-circuit in response to a continuous low-level state of the fast discharge signal within the preset time; or generate the second judgment signal and send the second judgment signal to the buffer sub-circuit in response to a continuous low-level state of a scan driver start pulse signal within the preset time; wherein the scan driver start pulse signal is used to indicate that an image signal frame starts to be transmitted.

7. The driver IC according to claim 5, wherein the buffer sub-circuit is further configured to:

generate a second control signal and send the second control signal to the power-off sub-circuit in response to the second judgment signal within the preset time; and the power-off sub-circuit is further configured to:

control the driver IC to perform the power-off operation in response to the second control signal.

8. The driver IC according to claim 1, wherein the driver IC is applicable to a China Standard Point to Point Interface transmission protocol.

9. The driver IC according to claim 1, wherein the fast discharge circuit further comprises:

an electrostatic protection sub-circuit, connected to the access port and the sensing sub-circuit, and configured to perform an electrostatic discharge on the driver IC.

10. The driver IC according to claim 9, wherein the electrostatic protection sub-circuit comprises:

a diode, comprising a positive electrode connected to a preset low potential and a negative electrode connected to the access port and the sensing sub-circuit; and a transistor, comprising a control electrode connected to the preset low potential, a first electrode connected to the preset low potential, and a second electrode connected to the access port and the sensing sub-circuit.

11. The driver IC according to claim 1, wherein the power-off sub-circuit comprises:

a latch unit, configured to generate a latch signal and send the latch signal to a power-off unit in response to the control signal; and the power-off unit, configured to perform or not to perform the power-off operation in response to the latch signal.

12. A display panel, comprising a driver IC, and the driver IC comprising a fast discharge circuit; wherein the fast discharge circuit comprises:

an access port, configured to access a fast discharge signal; wherein the fast discharge signal is used to indicate that the driver IC is powered off;

a sensing sub-circuit, connected to the access port and a power supply voltage, and configured to sense a falling edge of the fast discharge signal;

a buffer sub-circuit, connected to the sensing sub-circuit, a judgment sub-circuit and a power-off sub-circuit, and configured to generate a control signal and send the control signal to the power-off sub-circuit in response to a judgment signal output by the judgment sub-circuit within a preset time after the sensing sub-circuit senses the falling edge of the fast discharge signal;

the judgment sub-circuit, connected to the buffer sub-circuit, and configured to generate the judgment signal according to a state of a target signal within the preset time, and send the judgment signal to the buffer sub-circuit; and the power-off sub-circuit, connected to the buffer sub-circuit, and configured to control the driver IC to perform or not to perform a power-off operation in response to the control signal.

13. A driving method of a display panel, applied to a driver IC, wherein the driver IC comprises a fast discharge circuit, and the fast discharge circuit comprises an access port for accessing a fast discharge signal, a judgment sub-circuit, a buffer sub-circuit and a power-off sub-circuit, and the driving method comprises:

generating, by the judgment sub-circuit, a judgment signal according to a target signal within a preset time in response to a falling edge of the fast discharge signal;

generating, by the buffer sub-circuit, a control signal and sending the control signal to the power-off sub-circuit in response to the judgment signal; and controlling, by the power-off sub-circuit, the driver IC to perform or not to perform a power-off operation in response to the control signal.

14. The driving method of the display panel according to claim 13, wherein generating, by the judgment sub-circuit, the judgment signal according to the target signal within the preset time in response to the falling edge of the fast discharge signal comprises:

generating, by the judgment sub-circuit, a first judgment signal and sending the first judgment signal to the buffer sub-circuit in response to a rising edge of the target signal within the preset time.

15. The driving method of the display panel according to claim 14, wherein generating, by the judgment sub-circuit, the first judgment signal and sending the first judgment signal to the buffer sub-circuit in response to the rising edge of the target signal within the preset time comprises:

generating, by the judgment sub-circuit, the first judgment signal and sending the first judgment signal to the buffer sub-circuit in response to a rising edge of the fast discharge signal within the preset time; or generating, by the judgment sub-circuit, the first judgment signal and sending the first judgment signal to the buffer sub-circuit in response to a rising edge of a scan driver start pulse signal within the preset time; wherein the scan driver start pulse signal is used to indicate that an image signal frame starts to be transmitted.

16. The driving method of the display panel according to claim 14, wherein the driving method further comprises:

generating, by the buffer sub-circuit, a first control signal and sending the first control signal to the power-off sub-circuit in response to the first judgment signal within the preset time; and controlling, by the power-off sub-circuit, the driver IC not to perform the power-off operation in response to the first control signal.

17. The driving method of the display panel according to claim 13, wherein generating, by the judgment sub-circuit, the judgment signal according to the target signal within the preset time in response to the falling edge of the fast discharge signal comprises:

generating, by the judgment sub-circuit, a second judgment signal and sending the second judgment signal to the buffer sub-circuit in response to a continuous low-level state of the target signal within the preset time.

18. The driving method of the display panel according to claim 17, wherein generating, by the judgment sub-circuit, the second judgment signal and sending the second judgment signal to the buffer sub-circuit in response to the continuous low-level state of the target signal within the preset time comprises:

generating, by the judgment sub-circuit, the second judgment signal and sending the second judgment signal to the buffer sub-circuit in response to a continuous low-level state of the fast discharge signal within the preset time; or generating, by the judgment sub-circuit, the second judgment signal and sending the second judgment signal to the buffer sub-circuit in response to a continuous low-level state of a scan driver start pulse signal within the preset time; wherein the scan driver start pulse signal is used to indicate that an image signal frame starts to be transmitted.

19. The driving method of the display panel according to claim 17, wherein the driving method further comprises:

generating, by the buffer sub-circuit, a second control signal and sending the second control signal to the power-off sub-circuit in response to the second judgment signal within the preset time; and controlling, by the power-off sub-circuit, the driver IC to perform the power-off operation in response to the second control signal.

20. The driving method of the display panel according to claim 13, wherein the driving method is applicable to a China Standard Point to Point Interface transmission protocol.

* * * * *